Jan. 25, 1966  M. M. F. BRUYERE  3,230,741
COUPLING DEVICE
Filed Jan. 28, 1963
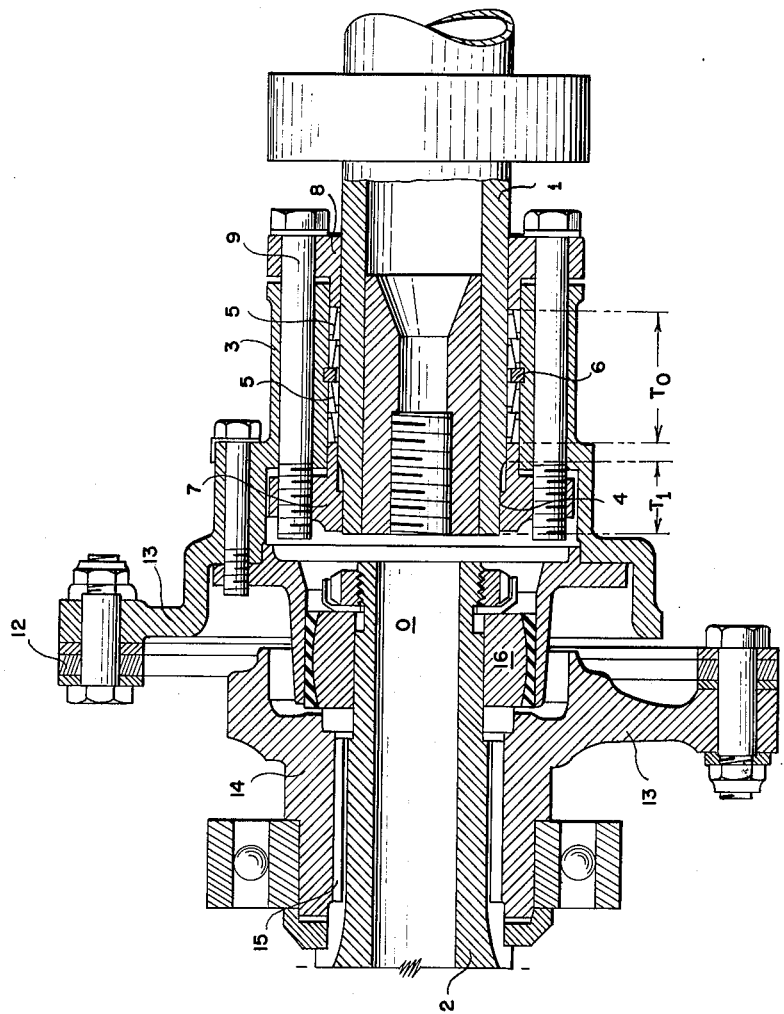
INVENTOR
MARCEL M. F. BRUYERE
BY Larson and Taylor
ATTORNEYS United States Patent Office 3,230,741
Patented Jan. 25, 1966

3,230,741
COUPLING DEVICE
Marcel Martin François Bruyère, Bois-Colombes, France, assignor to Societe d'Exploitation des Materiels Hispano-Suiza, Bois-Colombes, France, a society of France
Filed Jan. 28, 1963, Ser. No. 254,333
Claims priority, application France, Jan. 31, 1962, 886,563
2 Claims. (Cl. 64—30)

The present invention relates to devices for coupling in a permanent manner two rotating shafts. The invention is more especially, but not exclusively, concerned with devices of this kind for coupling together two shafts disposed end to end and intended to rotate at the same speed.

The chief object of the present invention is to provide a device of this kind which is better adapted to meet the requirements of practice than those used for the same purpose, up to this time.

Such a device includes two distinct coupling means mounted in parallel with respect to each other between the shafts to be coupled together, to wit, on the one hand friction coupling means for transmitting without slip any torque having an absolute value lower than a given predetermined value and, on the other hand, positive coupling means also interposed between said shafts.

The invention consists essentially in arranging the whole in such manner that, on the one hand said friction coupling means and said positive coupling means are mounted in permanent fashion (that is to say without possibility of unconnection) between one of the shafts to be coupled together and a sleeve coaxial with this shaft and itself positively coupled with the other shaft, and that, on the other hand, the portion of said first mentioned shaft at the level of which said friction coupling means is provided, is a smooth shaft portion, that is to say without variation in the cross section thereof. Preferably said friction coupling means are disposed, with respect to the positive coupling means, on the side of the transmission from which the torque to be transmitted is supplied.

The preferred embodiment of the present invention will be hereinafter described with reference to the appended drawing, given merely by way of example, and in which:

The drawing shows in longitudinal section by two planes making a given angle with each other, a coupling device made in accordance with the invention.

The device according to this invention is intended to connect driving shaft 1 with a driven shaft 2, these two shafts being disposed end to end.

This coupling device comprises coupling means of two respective different types mounted in parallel between said shafts 1 and 2, to wit on the one hand, friction coupling means for transmitting the torque from one shaft to the other without any angular slip as long as the absolute value of this torque is lower than a value C (limit torque) above which the transmission would take place with a relative angular slip between the driving shaft 1 and the driven shaft 2 and, on the other hand, positive coupling means adapted to prevent such an angular slip from taking place, said friction coupling means being preferably arranged in such manner that the torque limit value C corresponds substantially to the working torque to be transmitted.

Now, according to the main feature of the present invention, the embodiment of which is shown in the drawing, the coupling device is arranged in such manner that, On the one hand, the friction coupling means and the positive coupling means of this device are established in a permanent fashion (that is to say without possibility of disconnection) between one of the shafts to be coupled together, for instance as it will be hereinafter supposed the driving shaft 1, and a sleeve 3 coaxially surrounding said driving shaft 1, said sleeve 3 being itself positively coupled with the other shaft, in this case the driven shaft 2, for instance in a manner which will be more explicitly described hereinafter, and On the other hand, the portion $T_0$ of the driving shaft 1 at the level of which the friction coupling means are provided is a smooth shaft portion, that is to say a shaft portion free from any cross section variation, recess and so on, which might cause said shaft to break, said friction coupling means being consequently chosen so as to comply with the smooth structure of the portion $T_0$ of the driving shaft.

Preferably the portion $T_0$ of driving shaft 1 which cooperates with the friction coupling means is located, with respect to the portion $T_1$ of said shaft on which are mounted the positive coupling means, on the side of the transmission from which the torque to be transmitted is supplied.

When the transmission is brought into play and as long as the absolute value of the torque that is transmitted remains lower than the predetermined value C which characterizes the friction coupling means, that is to say as long as the torque that is transmitted remains within the margin defined by the extreme values —C and +C, transmission of the torque is ensured exclusively by said friction coupling means, without any action of the positive coupling means.

When the torque that is transmitted is beyond said margin, that is to say is greater than C in absolute value, the friction coupling means are no longer capable of preventing an angular slip between the two shafts, and the positive coupling means take charge of the excess of the absolute value of the torque to be transmitted over value C.

If, starting from this state, a torque ceases to be applied to the driving shaft 1, the positive coupling means will be relieved only of the charge applied thereto exceeding said value C, said positive coupling means then remaining loaded to a value equal to C.

In other words, as soon as the coupling device serves to transmit torques higher than torque C, the positive coupling means is stressed and said coupling device will be capable of transmitting torques ranging from —2C to +2C without the positive coupling means being subjected to alternate actions which may be prejudicial to its good holding.

If, as it is advantageous, torque C is chosen equal to the working torque of the transmission, it is only in very exceptional cases that alternate stresses will appear in the positive coupling means. Anyway, even in this case, the alternate stresses will be much lower than the value they would have in the absence of the friction coupling means, that is to say, if the torques were transmitted merely through the positive coupling means.

From another point of view, owing to the provision of said positive coupling means, it is possible to develop, in the transmission, torques higher than value C, without having to increase the dimensions of the friction coupling means.

Advantageously the positive coupling means are disposed nearer to the driving shaft 1.

In the embodiment of the invention illustrated by the drawing, the positive coupling means consist of cooperating ribs 4 provided respectively at the end of driving shaft 1 and in sleeve 3.

As for the friction coupling means, in the construction illustrated by the drawing, they consist of several pairs of resilient washers 5, preferably of metal. Every pair of washers comprises an external washer and an internal washer in contact with each other along a frusto-conical surface, in such manner that when an axial compression stress is exerted tending to engage the inner washer more deeply into the outer washer, there is produced a reduction of said inner washer and an expansion of said outer washer.

It suffices, in these conditions, in order to provide the friction coupling means, of inserting pairs of washers 5 between the end of the driving shaft 1 and sleeve 3 (for instance four pairs of washers symmetrically distributed on either side of a stop 6 carried by sleeve 3) and to provide said sleeve 3 with means for axially compressing washers 5. The last mentioned means consist for instance of two flanges 7 and 8 mounted on shaft 1 disposed respectively on either side of sleeve 3 and connected together by longitudinal bolts 9 extending through said sleeve 3. According to this construction, as said bolts are more or less screwed in flange 7, adjustment of torque C may be varied.

In this case, the complementary ribs 4 of the positive coupling means are provided respectively at the end of shaft 1 and in the inner wall of flange 7.

The means for positively coupling sleeve 3 with respect to driven shaft 2 will now be described.

If no possible misalinement is provided between shafts 1 and 2, the coupling means between sleeve 3 and shaft 2 may be any rigid fixation means of a suitable type.

On the contrary if, as it will be hereinafter supposed, shafts 1 and 2 must be capable of slight misalinements with respect to each other without involving dangerous deformations or fatigues of the pieces serving to connect said shafts together, there must be provided between driven shaft 2 and sleeve 3 a connecting device having some flexibility. Preferably this connecting device comprises a flexible peripheral annular member 12 constituted for instance by the juxtaposition of steel rings, connected through radial arms 13 on the one hand to sleeve 3 and, on the other hand to a sleeve 14 caused to rotate together with driven shaft 2 by ribs 15.

Such peripheral connecting means, which are known commercially under the trademark name "FLECTOR," permit slight misalinements of shafts 1 and 2 pivotally about a center O which is materialized by a ball member 16.

In a general manner, while the above description discloses what are deemed to be a practical and efficient embodiment of the invention, said invention is not limited thereto as there might be changes made in the arrangement, disposition and form of the parts without departing from the principle of the invention as comprehended within the scope of the appended claims.

What I claim is:
1. A coupling device comprising first and second shafts,
   said first shaft having a smooth portion thereof,
   journal means for supporting said second shaft substantially in alignment with said first shaft,
   a first sleeve positively coupled in rotation with a second sleeve,
   a flexible peripheral annular member connecting said first and second sleeves,
   said second sleeve positively coupled in rotation with said second shaft,
   said first sleeve coaxially surrounding a portion of said first shaft,
   first coupling means between said first sleeve and the portion of said first shaft surrounded by said first sleeve,
   said first coupling means being friction coupling means and including at least two resilient washers comprising at least one internal and one external washer, said external washer having a cylindrical outer surface in contact with the inner surface of said first sleeve, said internal washer having a cylindrical inner surface in contact with the smooth surface portion of said first shaft, said two washers engaging each other along cooperating frusto-conical respective surfaces thereof,
   means operatively connected with both of said washers for axially urging both of said washers with an adjustable force, whereby the deformation of the resilient washers can be adjusted,
   second coupling means between said first sleeve and said first shaft, said second coupling means being positive coupling means capable, when the actual torque transmitted from one of said shafts to the other exceeds the value of the maximum torque that can be transmitted by said friction coupling means, of transmitting from one shaft to the other the difference between said actual torque and said maximum torque, and
   said first and second sleeves cooperating to transmit rotation between the shafts through cooperation with said flexible annular member, and to compensate for any slight misalignment of the shafts.
2. A device according to claim 1, wherein said friction coupling means is disposed, with respect to the positive coupling means, on the side of the transmission from which the torque to be transmitted is supplied.

References Cited by the Examiner
UNITED STATES PATENTS

| | | | |
|---|---|---|---|
| 2,438,866 | 3/1948 | Rockwell et al. | |
| 2,527,517 | 10/1950 | Baker et al. | |
| 2,763,141 | 9/1956 | Dodge | 64—30 |
| 2,795,398 | 6/1957 | Ragland | 64—11 |
| 2,883,839 | 4/1959 | Troeger et al. | 64—13 |
| 3,101,962 | 8/1963 | Nullist | 64—30 X |

FOREIGN PATENTS

| | | |
|---|---|---|
| 537,452 | 3/1922 | France. |
| 547,856 | 10/1922 | France. |
| 697,252 | 10/1940 | Germany. |
| 390,420 | 4/1935 | Great Britain. |
| 431,026 | 6/1935 | Great Britain. |

BROUGHTON G. DURHAM, *Primary Examiner.*

ROBERT C. RIORDON, FRANK SUSKO, *Examiners.*